April 24, 1962 F. J. MELGES 3,030,957
DISPOSABLE OBSTETRICAL AND/OR SURGICAL COVER MEANS
Filed March 6, 1959 5 Sheets-Sheet 1
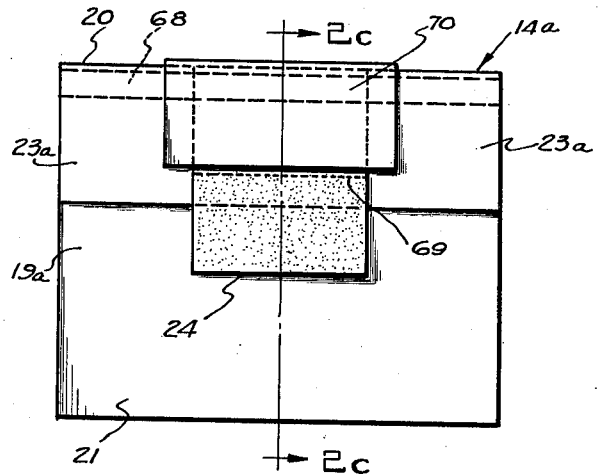
FIG_2b_
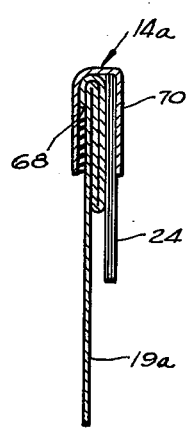
FIG_2c_
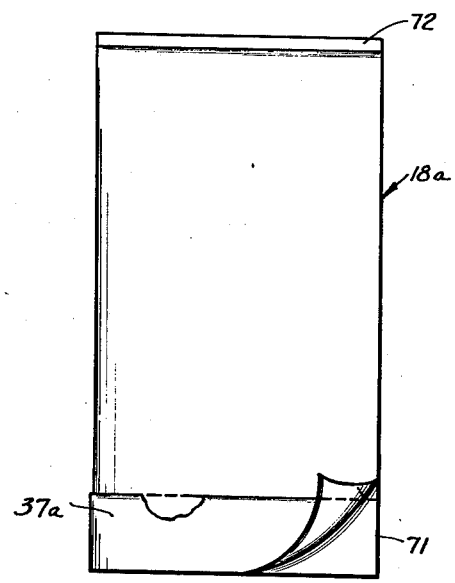
FIG_4a_
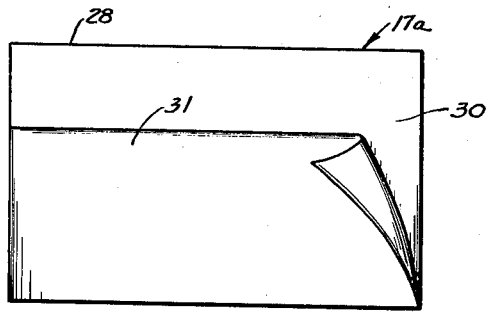
FIG_3a_
INVENTOR
Frederick J. Melges
BY Roy A. Plant
ATTORNEY April 24, 1962     F. J. MELGES     3,030,957
DISPOSABLE OBSTETRICAL AND/OR SURGICAL COVER MEANS
Filed March 6, 1959     5 Sheets-Sheet 2
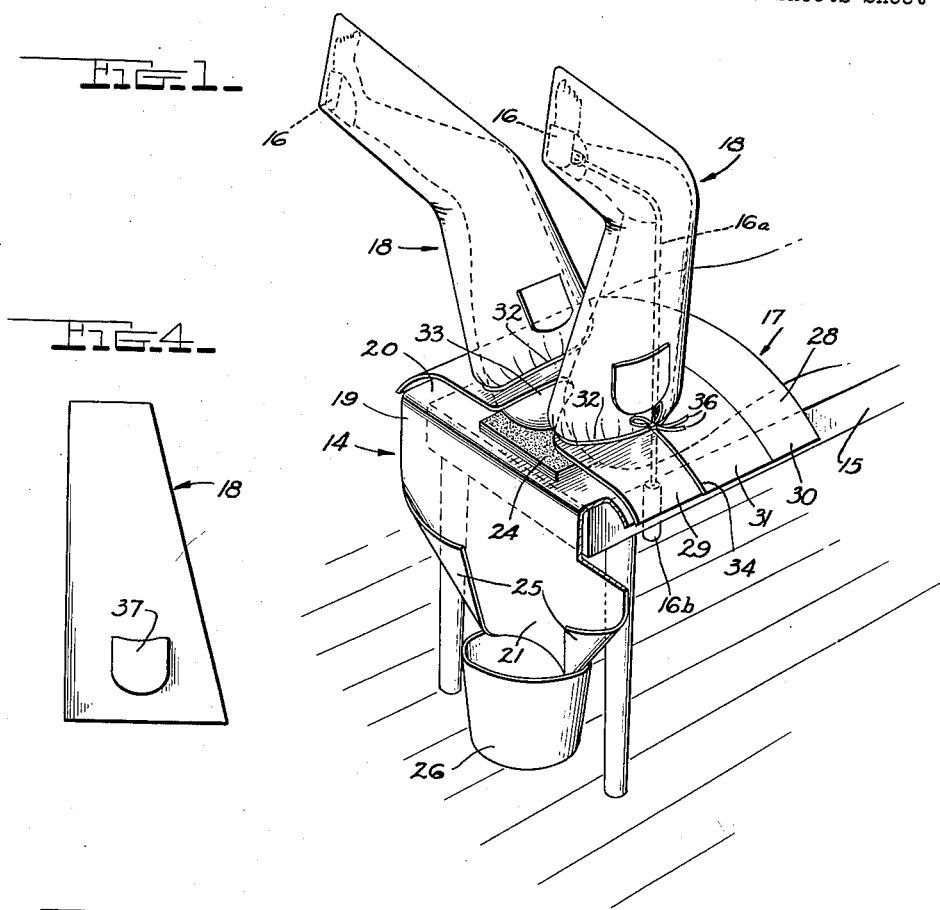
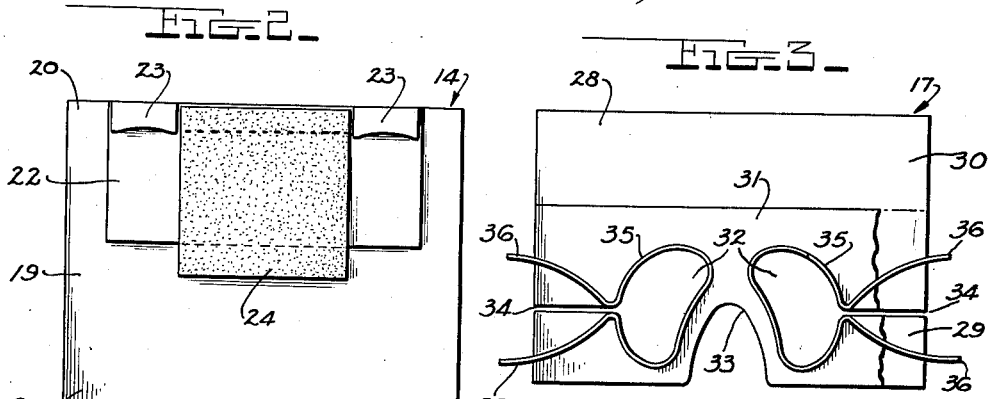
INVENTOR
*Frederick J. Melges*
BY *Roy A. Plant*
ATTORNEY

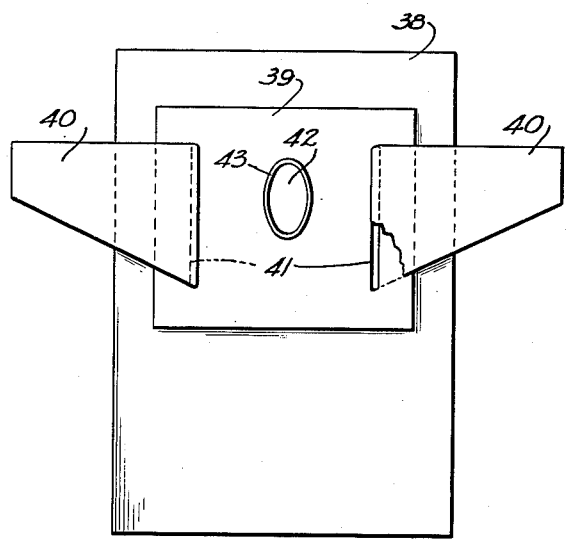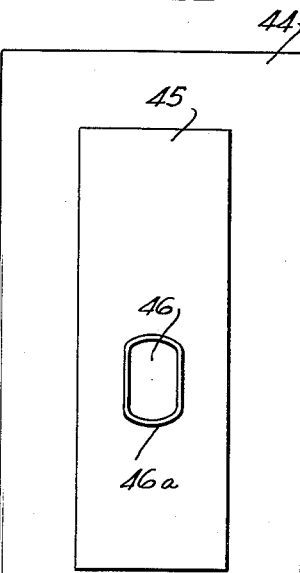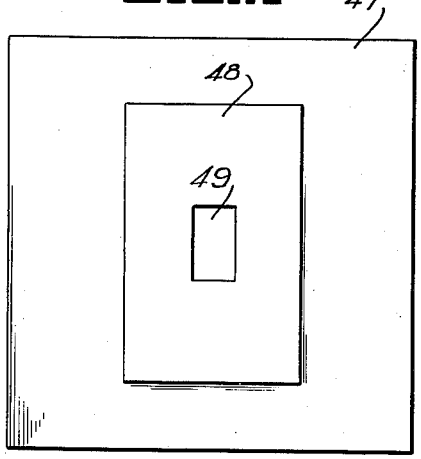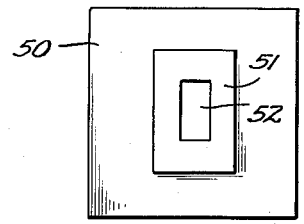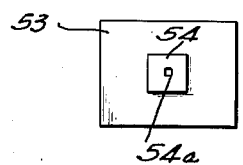

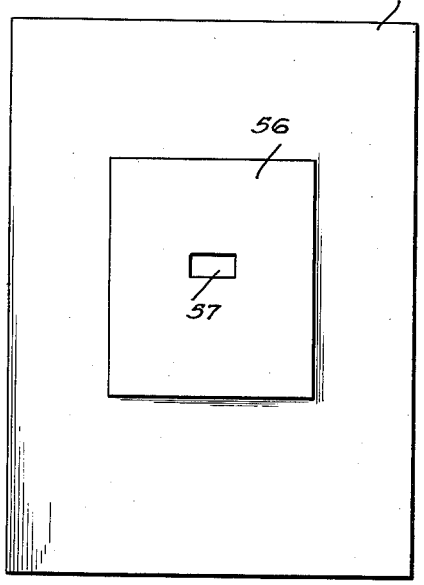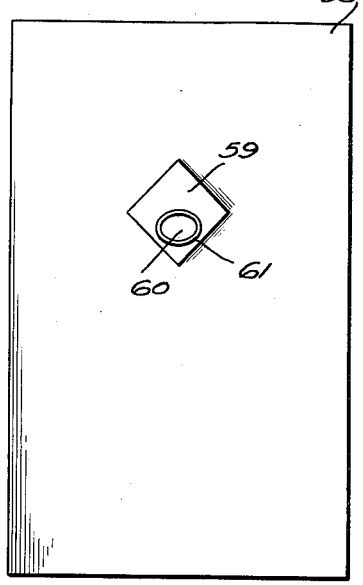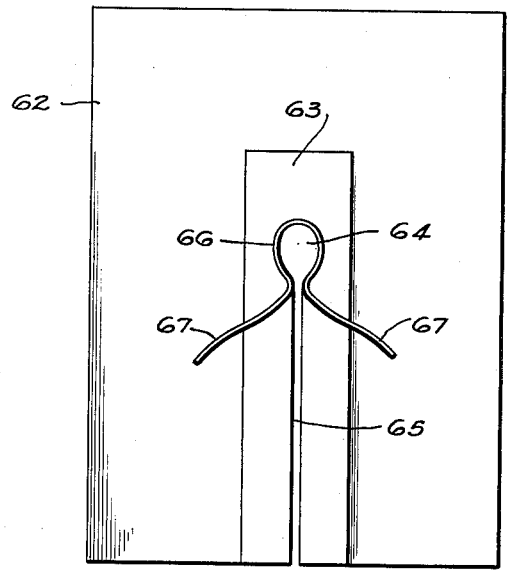

April 24, 1962  F. J. MELGES  3,030,957
DISPOSABLE OBSTETRICAL AND/OR SURGICAL COVER MEANS
Filed March 6, 1959  5 Sheets-Sheet 5
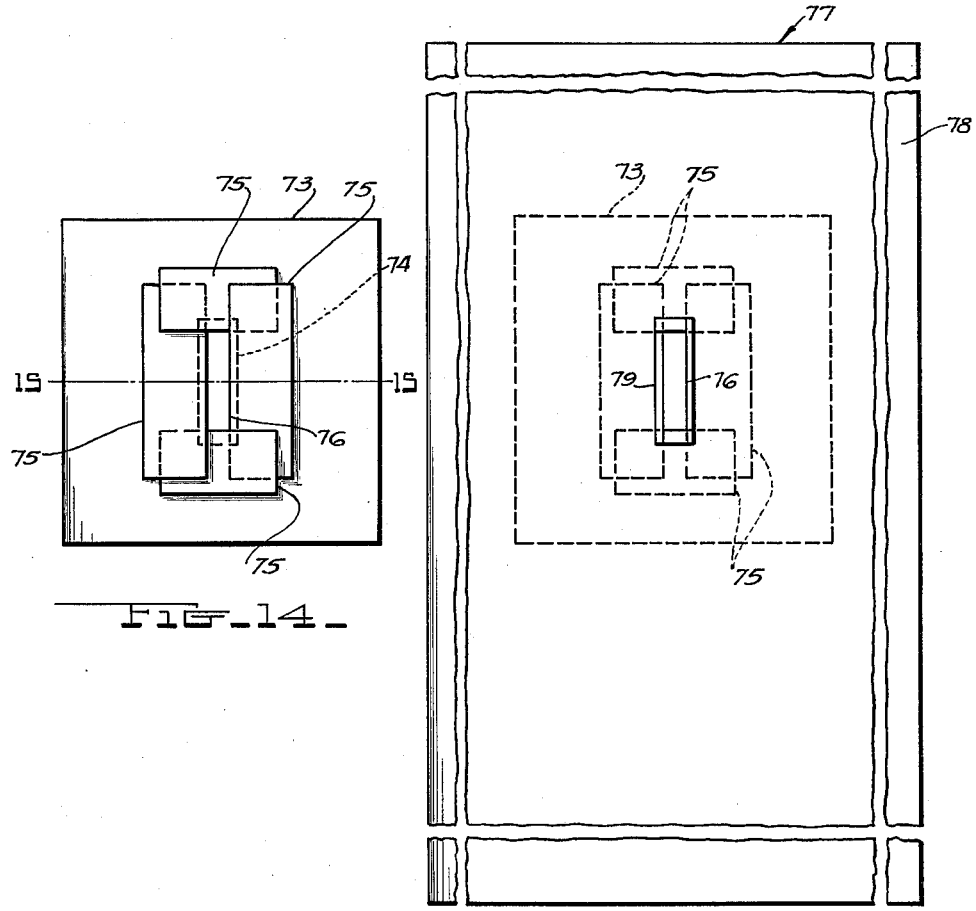
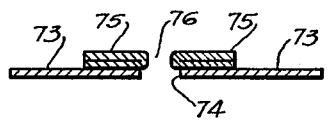
INVENTOR
Frederick J. Melges
BY Roy A. Plant
ATTORNEY 3,030,957
DISPOSABLE OBSTETRICAL AND/OR SURGICAL
COVER MEANS
Frederick J. Melges, 314 Orchard Ave.,
Battle Creek, Mich.
Filed Mar. 6, 1959, Ser. No. 797,811
21 Claims. (Cl. 128—292)

The present invention relates broadly to hospital operating room supplies, and in its specific phases to disposable obstetrical and/or surgical shield or cover members made from paper or the like.

The present application is a continuation-in-part of my copending application Serial No. 402,989, filed January 8, 1954, now abandoned.

In preparing for obstetrical and gynecological operations and the like, it is customary to shield the patient and the operating or delivery table with sterile linens, and this procedure entails a great deal of distasteful hand work at the end of the operation together with linen repairs, preparation of packs, storage, autoclaving, and miscellaneous expense for linen handling and laundering as well as investment in linens. Similar and likewise expensive procedures are followed in preparing patients for various other operations. Microorganisms carried by blood and obstetrical fluids, as well as contamination by direct contact with infected cases or by handling, et cetera, can also pass through the spaces between threads of cloth cover members, from one side of same to the other, and inadvertently cause infection even though the cloth cover members were perfectly sterilized before using. Also some stains are extremely difficult to remove from cloth cover members, and may form the starting point or starting source for infection, particularly when hard to kill organisms are involved and perfect sterilization has not been attained. It was a recognition of this situation and the need of something to overcome not only distasteful hand work and infection due to passage of infecting organisms through the open spaces between threads of cloth cover members, but also the large linen investment of hospitals in the operating room portion of same, and the need of some way to reduce costs and laundry work which led to the conception and development of the present invention.

Accordingly the present invention is designed to provide a novel and inexpensive sterile paper shield or cover member which, in one form or another, will be a handy and effective substitute for the previously used linens, and after use may be simply crumpled and dropped into an incinerator, thus destroying any possibility of reinfection since the materials used for draping the patient are disposed of. At the same time this procedure effects a reduction in labor required as well as a substantial cost saving while obviating not only laundering but the unpleasant task of handling soiled operating room linens.

In carrying out the above end, another object is to provide a sterile sheet of paper to cover the portion of a patient contiguous to the point at which an operation is to be performed, to provide said paper sheet with an opening through which to operate, or through which to extend a limb of the patient, and to provide said paper sheet with an effectively reinforced area around this opening or openings.

A further object is to form at least part of the paper sheets out of a soft water-resistant paper which is reinforced and forms a barrier substantially preventing the passage therethrough, along with obstetrical and/or operating fluids, of infectious organisms.

The present invention being one aimed at the obviating of the use of woven materials, commonly called "linens," where used in connection with surgery and obstetrics, it is a further object of this invention to substitute for such "linens" suitable replacement items formed from a disposable non-woven material, which can be generally referred to as a cellulose fabric. This material, as hereinafter set forth, is preferably moderately soft, relatively strong and tear resistant, is relatively strong when wet, and may be self-reinforced. Paper is made in many types with or without reinforcement and is a typical disposable non-woven material and accordingly the term "paper" has been used herein at many places in the specification and claims to generally indicate non-woven material which has proven satisfactory in carrying out the present invention.

A further object is to provide the paper sheet just mentioned with a split extending to one of its edges from the opening to aid in easily positioning said sheet for use.

A still further object is to provide such a paper sheet as that above mentioned with a flexible tie extending around the edge of the opening and having free ends at opposite edges of the split in position to be tied together to aid in holding the sheet in proper position.

Another object is to provide a paper shield or cover member having an operating opening therethrough, with said sheet not only reinforced over a relatively large area around said opening, but being further reinforced around the edge of the opening so that the latter is of smooth folded edge form.

Another object is to provide a sterile paper shield or cover member having pockets, which, if desired, may be of folded edge or cuff-like form, and into which a nurse may insert her hands when positioning the shield for use, this being of particular advantage when the shield is to be tucked under a patient's buttocks, or when the shield is in the form of a stocking to be threaded over a piece of equipment, such as a Mayo stand, or placed around a patient's leg and a stirrup including assembly supporting the leg in elevated position.

Yet another object is to provide a sterile paper shield or cover member to underlie at least the buttocks of a patient lying on a delivery or operating table with the legs held in elevated position, and to provide said shield with a pad of sterile absorbent paper leaves to receive any discharged fluid and to be torn off one or more at a time as needed, to expose the next clean leaf.

A still further object is to provide a sterile paper shield or cover member to underlie a patient's buttocks and to hang down at the foot of an operating or delivery table, the sheet being adapted for inward curling at its lower corners to provide a funnel-like formation which may be inserted into a receptacle, to guide any discharged fluids into the receptacle.

Yet another object is to provide a sterile, disposable paper shield or cover member which may be compactly marketed in a properly identified sanitary package, in readiness for quick removal and use.

Still further objects and advantages of the present invention will appear as the description proceeds.

To the accomplishment of the foregoing and related ends, the invention, then, consists of the shield or cover means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

FIGURE 1 is a perspective view, partly broken away and in section, showing four of the shield or cover members positioned for use in an obstetrical or similar operation.

FIGURE 2 is a plan view of the shield of FIGURE 1 which hangs down at the foot of the operating or delivery table, but modified to show the use of a larger size pad.

FIGURE 2a is a fragmentary plan view showing a modification of the shield of FIGURE 2.

FIGURE 2b is a plan view of a modified form of the shield shown in FIGURE 2, with the pocket means and reinforced portion of same being simplified for ease of manufacture and use.

FIGURE 2c is an enlarged and opened-up sectional view as taken along the line 2c—2c of FIGURE 2b, looking in the direction of the arrows.

FIGURE 3 is a plan view, partly broken away, showing the upper or patient-covering shield of FIGURE 1.

FIGURE 3a is a plan view, with a corner portion of the reinforcing member turned back, illustrating a simplified form of the upper or patient-covering shield shown in FIGURE 3.

FIGURE 4 is a plan view of one of the leg-covering shields of FIGURE 1.

FIGURE 4a is a plan view, partially broken away and with a corner portion turned back, showing a modified form of the leg-covering shield or cover member of FIGURE 4.

FIGURES 5 to 12, inclusive, are plan views of shields or cover members for various operations individually referred to hereinafter.

FIGURE 13 is a partially broken away plan view of a shield or cover member having a specially reinforced opening therethrough.

FIGURE 14 is a plan view of a preferred form of the reinforcing portion of the shield or cover member shown in FIGURE 13.

FIGURE 15 is an enlarged section view as taken substantially on the line 15—15 of FIGURE 14.

Referring more particularly to FIGURE 1 of the drawings, one shield or cover member 14 is shown underlying the buttocks of a patient, lying upon an operating or delivery table 15 with her legs held in elevated position by diagrammatically shown stirrups 16, only one supporting member 16a of same with its socket mounting member 16b being shown, said shield hanging down at the foot of the table. A second shield or cover member 17 is shown covering the pelvic and abdominal region of the patient, and two leg shields or cover members 18 are disclosed covering the patient's legs and feet. All of these shields are preferably used together in obstetrical or gynecological cases.

In forming the shield 14, as illustrated in FIGURE 2, a rectangular sterile, and preferably at least semi-waterproofed paper sheet 19 is provided having an upper end portion 20 to be tucked under the patient's buttocks, and a lower end portion 21 to hang down at the foot of the table 15. The upper end portion 20 has a rectangular reinforced area 22, preferably formed by a plural-ply construction. Near the upper corners of this upper end portion 20, there are two pockets 23 secured upon the reinforced area 22. Also secured upon this area 22, there is a pad 24 of absorbent paper leaves which may be of any desired size, with a small size being shown in FIGURE 1, while a larger size is shown in FIGURE 2.

The pockets 23 facilitate tucking of the upper end portion 20 of the sheet 19 under the patient's buttocks, as a nurse may insert her fingers into said pockets and push the sheet into place. The pad 24 then occupies a position under the vagina and rectum and the leaves of said pad may be torn off as required as they become saturated with fluids during the delivery or operation. The lower corner portions of the sheet 19 may be inwardly curled as shown at 25 in FIGURE 1 and inserted into a receptacle 26, providing a funnel-like formation for directing and receiving any fluids not caught by the pad 24. To aid in holding the curled corner portions 25 in place, a bendable holding wire 27, FIGURE 2a, may be attached to the sheet 19 along the edges defining said corner portions.

In FIGURES 2b and 2c a modified form 14a of the shield 14 of FIGURE 2 is illustrated. Here the preferably high wet strength, relatively soft and self-reinforced, semi-water-proofed paper sheet 19a, as shown in enlarged and opened-up section in FIGURE 2c, has its upper end doubled and folded forward to produce a wide reinforced area which forms pockets 23a, and with a single thickness edge portion 68 extending over and down the back face of sheet 19a to give a double thickness reinforced edge for the nurse's finger tips to push against in forcing the shield under the patient's buttocks. The pad 24 is then placed with its upper edge along the center of the upper edge of sheet 19a. The leaves of this pad are preferably perforated along a line 69 to facilitate tearing off as required when they become saturated with fluids during delivery or operation. These sheets are preferably of two ply moderately soft material with the upper ply being fluid absorbent and the under ply being at least semi-water-proof and having good wet-strength. With the pad 24 in place an anchoring member 70, which is a little wider than pad 24, is placed on the upper end portion of pad 24 and over and down the back of sheet 19a a distance preferably approximately the same as the front overhang. This anchoring member is adhesively fastened in place and securely locks the pad 24 and folded upper portion of sheet 19a against movement out of position.

In forming the upper or patient-covering shield 17 (FIGURE 3), a rectangular, sterile sheet of paper 28 is provided, said sheet 28 having a pelvis covering end portion 29 and an abdomen covering end portion 30. The end portion 29 is reinforced at 31, preferably provided by a plural-ply construction. This reinforced portion 29, 31 of the sheet 28 has two openings 32 to receive the patient's thighs, and said reinforced portion also has a notch 33 between said openings 32, through which to deliver or operate.

To facilitate placing of the shield 17, and the adjustment of same to the patient, slits 34 are provided from the openings 32 to the side edges of the reinforced sheet portion 29, 31. The edges of the openings 32 are reinforced by tapes or the like 35, the ends of which are extended and free at the slits 34 to constitute ties 36 for tying the shield in place around the patient's thighs.

In many cases a simplified patient-covering shield 17a, FIGURE 3a, may be used since the most important thing is to cover the patient's abdomen during the deliver or operation. This sheet is preferably formed from a moderately soft, self-reinforced, and high wet-strength paper which has its lower edge folded up to form an upper reinforcement ply 31 for the rest of the paper sheet 28 which comes into direct contact with the patient. This reinforcement ply 31 is preferably adhesively held in the position illustrated. If it is desired to specially hold shield 17a in position during the delivery or operation, it may be held by clipping to the paper stockings 18 or 18a and/or the lower shield 14 or 14a which is equivalent to anchoring with ties 36 and to be considered as diagrammatically shown by same.

Each leg shield 18 (FIGURE 4) is in the form of a sterile paper stocking to cover a leg and foot of the patient. As these leg shields must be slipped over the stirrups 16 and their supports 16a as well as over the patient's legs and feet, they must be adequately oversize. Opposite sides of each leg shield are provided with pockets 37. Into these pockets, a nurse may insert the fingers of her hands to aid in slipping the shields over the patient's legs and feet, the stirrups 16 and the stirrup supports 16a which are conventionally fastened to table 15 by means of socket mounting members 16b.

A modified form of the leg shield is shown in FIGURE 4a where the leg shield 18a, for simplicity of manufacture, is made substantially rectangular and provided with its pocket 37a in the form of a wide reinforcing cuff, at the open end of the leg shield, and into which the nurse can insert the fingers of her hands as an aid to fitting the leg shield in place over a patient's leg and leg support 16a. If desired the cuff end of the shield may have a short open edge portion 71 at one side, as shown, to facilitate starting the shield over the patient's leg, and to allow the shield to be pulled down a little further on the leg to provide better coverage and more material in handier position for anchoring to a body-covering shield such as shown in FIGURE 3a.

After the patient is placed on the table 15, the shield 14 or 14a is applied, then the leg shields 18, or 18a, and finally the upper or body shield 17 or 17a. When the ties 36 of shield 17 are tied, they draw the tapes or the like 35 around the large or thigh ends of the leg shields 18 or 18a and contract and hold the latter snugly around the patient's thighs. As fluids are absorbed by the leaves of the pad 24, said leaves may be torn off as required, and any excess fluids will be funneled into the receptacle 26. After the delivery or operation, all of the shields may be quickly and easily removed for incineration. One of the leg shields 18 or 18a may be used as a bag in which to place the thus used paper cover members and accordingly serve as a convenient way to prepare them for transportation to the incinerator.

The shield 14 or 14a is preferably about 42" x 52" and the shield 17 about 36" x 52". Each leg shield 18 may be about 42" long and when in flattened form may have a width of 24" at its open end and 10" at its other end, which may be closed if desired. The leg shields, as typically shown in FIGURE 4a, preferably have only front and back panels which are joined together at their edges to form a tube with bulgable sides as shown in FIGURES 1 and 5. Leg shield 18a is made from stock preferably about 50" wide, which when formed into a shield, may, if desired, be about 38" long with a 10" cuff at its open end, and a 2" folded and adhesively closed upper end 72.

FIGURE 5 discloses a composite disposable sterile paper patient covering sheet for use in operations on the vagina, rectum, and male and female genitalia, with the patient lying on his or her back and with the legs supported and held in the stirrups. In this form of the invention, a sheet of paper 38 is provided of a size of about 60" x 82", said sheet 38 having a rectangular reinforced area 39 near one end. The sheet 38 is provided with paper stocking-like leg shields 40 attached to the reinforced portion 39, and this portion 39 has entrance slots 41 for said shields 40. An operating opening 42 is also formed through the reinforced portion 39 between and at predetermined spacing from the two slots 41, the edge of this opening being further reinforced at 43 to prevent tearing.

In FIGURE 6, a large size sterile, disposable, general-purpose laparotomy sheet is shown, to cover a patient. This sheet comprises an elongated rectangular paper sheet 44 about 6' x 14', said sheet having an elongated reinforced area 45, and an operating opening 46 through this reinforced area. The edge of the opening 46 is further reinforced at 46a, as by a folded edge reinforcing means extending around said opening to form a smooth rounded edge therefore while further strengthening same against accidental tearing. Said reinforcing means extending around said opening is also not only relatively soft but at least semi-water-resistant.

FIGURE 7 discloses a medium size sterile, disposable laparotomy sheet. This sheet comprises a sheet of paper 47 about 6' square, said sheet having a reinforced area 48 and an operating opening 49 through said area.

FIGURE 8 discloses a small size sterile, disposable laparotomy sheet 50 having a reinforced area 51, and an operating opening 52 through said area 51. The sheet 50 is about 3' x 3'.

FIGURE 9 shows a sterile, disposable, circumcision sheet 53 about 18" x 24", said sheet having a reinforced area 54, and a small opening 54a through said reinforced area.

The sheet 55 of FIGURE 10 is a sterile, disposable, nephrectomy sheet about 6' x 8', said sheet having a reinforced area 56, and an operating opening 57 through said area, said opening 57 being elongated transversely of the sheet.

FIGURE 11 discloses a sterile, disposable thyroidectomy sheet 58 about 5' x 8', said sheet having a rather restricted reinforced area 59, and an operating opening 60 through said area 59. The edge of the opening 60 is further reinforced at 61 substantially in the same manner as set forth in connection with the laparotomy sheet shown in FIGURE 6.

FIGURE 12 discloses a sterile, disposable craniotomy sheet 62 about 6' x 8'. This sheet 62 has a relatively narrow reinforced area 63 extending centrally of the sheet from a point near one end of the latter to the other end thereof. An opening 64 is formed through the inner end portion of the reinforced area 63, and a slit 65 extends from this opening to the other end of said reinforced area. A reinforcing tape or the like 66 is secured to the sheet 62 around the edge of the opening 64, said tape or the like having extended ends 67 at opposite sides of the slit 65, and constituting ties to be tied together to hold the sheet in place.

FIGURES 13, 14, and 15 show a variant form of the laparotomy sheets illustrated in FIGURES 6 to 11, inclusive, and show the specific details of a preferred way of providing extra reinforcing for the edges of the operating opening, and which reinforcement has been diagrammatically indicated in FIGURES 5, 6, and 11. The preferred reinforcement of the operating opening of the paper shield or cover sheet is one which is smooth and free from rough or cut edges, and one such form of reinforcement will now be described.

Referring to FIGURES 13, 14, and 15 it will be noted that all four edges of the operating opening are formed with folded members. First, the completed sheet, FIGURE 13, is provided with a reinforcing sheet 73, FIGURE 14, which is preferably relatively soft, self-reinforced, and at least semi-water-proof. This sheet lies next to the patient, is centered on the operating area, and has an opening 74 through which the operation takes place. Over sheet 73 and around opening 74 are four folded reinforcing members 75, preferably formed from the same type of paper, laid so as to extend inside the edges of opening 74 and with the folded edges of reinforcing members 75 forming the edges of the operating opening 76. These four reinforcing members can be laid in any suitable manner, but the alternate end overlapping pattern shown in FIGURE 14 is a preferred one. Such reinforcing members 75 are adhesively or otherwise conventionally fastened to reinforcing sheet 73.

The disposable general-purpose laparotomy sheet 77, FIGURE 13, comprises a paper sheet 78 which is preferably soft, self-reinforced, and relatively strong when wet. This sheet has an opening 79 through which the operating work takes place. The reinforcing sheet 73 with its reinforcing members 75, FIGURE 14, is mounted on the under side of sheet 78, as shown in FIGURE 13, and adhesively or otherwise suitably joined thereto to form the complete laparotomy sheet 77. While a longitudinally elongated rectangular operating opening 76 has been illustrated, the invention is not limited to that particular shape, size, or position as obviously the opening does not need to be of that specific shape since it could be square, triangular, crosswise extending, or otherwise, and can be large or small as indicated by the particular operation to be performed.

From the foregoing it will be seen that a novel and inexpensive, convenient and effective sterile paper shield or cover sheet has been provided for any of the stated or similar purposes, which shield may be incinerated after use and will therefore largely obviate handling and laundering of linens as heretofore required for child delivery and numerous other operations, while at the same time reducing the amount of hospital labor required. Each form of the shield or cover member may be compactly marketed in sterile form in an individual properly identified sanitary package, in readiness for quick removal and use, and it is a simple matter to select the necessary package or packages required for the particular situation involved.

Other modes of applying the principle of my invention may be employed instead of those explained, change being made as regards the article and combinations herein disclosed, provided the means stated by any of the following claims or the equivalent of such stated means be employed.

I therefore particularly point out and distinctly claim as my invention:

1. A disposable sterile shield or cover member for surgical or similar purposes, comprising a sheet of paper to cover part of the patient's body, said paper sheet having an extensive reinforced area, an opening through said reinforced area, and a slit from said opening to an edge of said sheet, together with a flexible reinforcing element secured to said sheet around the edge of said opening, said element having extended ends at opposite sides of said slit and constituting ties.

2. A disposable shield or cover assembly for use in conducting surgical operations, obstetrics, and the like on a suitable surface such as an operating table, comprising in combination a sheet of paper having one end portion to underlie the patient's buttocks and another end portion to hang down at the foot of the table, and pocket means secured on said first end portion of said paper sheet, said pocket means being on the upper surface of same and adapted to receive the nurse's fingers to aid in tucking said first end portion of said paper sheet under the patient's buttocks; and a pair of loose fitting paper stockings cooperating with said sheet of paper in forming a simplified cover assembly, and which stockings are open at one end, each having a pocket means on its outer face at the open end of same to receive a nurse's fingers to aid in slipping said stockings over and fully covering each of the legs of the patient resting on said sheet.

3. A disposable shield or cover assembly as specified in claim 2; wherein said pocket means of said paper sheet is in the form of a cross fold along and extending over the top edge of said sheet which it also reinforces, and said pocket means of each of said stockings is in the form of an outside cuff extending on opposite sides of the open end of same; and wherein there is a pad of absorbent surface leaves secured to the top central portion of the top face of said paper sheet.

4. A disposable shield or cover assembly for use in conducting surgical operations, obstetrics, and the like on a suitable surface such as an operating table, comprising a first sheet of paper having one end portion to underlie the patient's buttocks and another end portion to hang down at the foot of the table, and pocket means secured on said first end portion of said paper sheet, said pocket means being adapted to receive the nurse's fingers to aid in tucking said first end portion of said paper sheet under the patient's buttocks; a pair of loose fitting paper stockings, each having pocket means on its outer face at the open end of same to receive a nurse's fingers to aid in slipping said stockings over and fully covering each of the legs of the patient; and a second paper sheet or cover member of the assembly to cover at least the abdominal region of the patient, said second sheet being adapted to abut the patient's legs and be conventionally fastened to said paper stockings, whereby said first and second sheets with said stockings form a unitary disposable paper assembly cover for a patient.

5. A disposable shield or cover assembly for use in conducting surgical operations, obstetrics, and the like on a suitable surface such as an operating table, comprising a first sheet of paper having one end portion to underlie the patient's buttocks and another end portion to hang down at the foot of the table, and pocket means secured on said first end portion of said paper sheet, said pocket means being adapted to receive a nurse's fingers to aid in tucking said first end portion of said paper sheet under the patient's buttocks; a pair of loose fitting paper stockings, each having pocket means to receive the fingers of a nurse's hands to aid in slipping said stockings over and fully covering each of the legs of the patient; and a second paper sheet or cover member of the assembly to cover the pelvic and abdominal regions of the patient, said second paper sheet having spaced openings to receive and slide over the patient's thighs with said paper stockings covering same, said second sheet also having slits extending from said openings to opposite edges of same, flexible reinforcing elements secured to said second paper sheet around the edges of said openings, said flexible elements having extended free ends at opposite sides of said slits where same enter said openings and constituting ties for holding said second sheet and stockings firmly together and in place, said second sheet also having a notch in one edge between said spaced openings to expose the vaginal region of the patient, whereby said first and second sheets with said stockings form a unitary cover for a patient.

6. A structure as specified in claim 5; wherein said first sheet has an extensive exceptionally strong and tear resistant portion in the general area carrying said pocket means, there being a pad of absorbent leaves also secured to said sheet in the reinforced area of same in position to underlie the rectal and contiguous region of the patient, said leaves being individually detachable from said pad as required, and wherein said second sheet, which forms a cover member for the pelvic and abdominal regions of the patient, has an extensive exceptionally strong and tear resistant area in which said openings, notch, and slits are formed.

7. A disposable sterile operating or delivery table shield or cover member comprising a sheet of relatively strong and tear resistant paper having one end portion which is relatively straight across and continuous and adapted to underlie the patient's buttocks and another end portion to hang down at the foot of the table, and pocket means secured on the upper face of said first end portion of said paper sheet with said pocket means opening toward the second end thereof, and means reinforcing said first end portion of said sheet at said pocket means, said pocket means being adapted to receive a nurse's fingers to aid in tucking said first end portion of said paper sheet under the patient's buttocks.

8. A disposable sterile operating or delivery table shield or cover member comprising a sheet of paper having one end portion to underlie the patient's buttocks and another end portion to hang down at the foot of the table, and a pad of separate absorbent leaves secured together along one edge on said one end portion of said sheet adjacent the edge thereof so as to underlie the rectal and contiguous region of the patient, said leaves being individually detachable from said pad as required, together with pockets secured on said first end portion of said paper sheet at opposite sides of said pad, said pockets opening toward said other end and being adapted to receive a nurse's fingers to aid in tucking said first end portion of said paper sheet under the patient's buttocks.

9. A disposable sterile operating or delivery table shield or cover member comprising a sheet of paper having one end portion to underlie the patient's buttocks and another end portion to hang down at the foot of the table, and a pad of separate absorbent leaves secured together along one edge on said one end portion of said sheet adjacent the edge thereof so as to underlie the rectal and contiguous region of the patient, said leaves being individually detachable from said pad as required, together with pockets secured on said first end portion of said paper sheet at opposite sides of said pad, said pockets opening toward said other end and being adapted to receive a nurse's fingers to aid in tucking said first end portion of said paper sheet under the patient's buttocks, said first end portion of said paper sheet having an extensive reinforced area which is smaller than said paper sheet and upon which said pad and said pockets are secured.

10. A disposable sterile operating or delivery table shield or cover member comprising a sheet of paper which is exceptionally strong and tear resistant as well as at least semi-water-proof, said sheet having one end portion to underlie the patient's buttocks and provided with pocket means for use in pushing same into place, and another end portion to hang down at the foot of the table, said second end portion of said paper sheet having means in its corner portions so that they are adapted to be inwardly curled and held in that position when inserted into an open-top receptacle to funnel downwardly running fluids into said receptacle.

11. A disposable sterile operating or delivery table shield or cover member comprising a sheet of paper having one end portion to underlie the patient's buttocks and another end portion to hang down at the foot of the table, said second end portion of said paper sheet having corner portions adapted to be inwardly curled and inserted into an open-top receptacle to funnel downwardly running fluids into said receptacle, together with bendable wires secured to said sheet to hold said corners in inwardly curled position.

12. A disposable sterile shield or cover member for obstetrical or similar purposes comprising an exceptionally strong when wet, tear resistant, and moderately soft, paper sheet to cover the pelvic and abdominal regions of the patient, said paper sheet having spaced openings at one end to receive the patient's thighs, said paper sheet also having a notch in the edge of same at said end between said opening to expose the vaginal region of the patient.

13. A disposable sterile shield or cover member for obstetrical or similar purposes comprising a paper sheet to cover the pelvic and abdominal regions of the patient, said paper sheet having spaced openings to receive the patient's thighs, said paper sheet also having a notch between said openings to expose the vaginal region of the patient, said paper sheet also having slits from said openings to opposite edges of the sheet, and flexible reinforcing elements secured to said paper sheet around the edges of said openings, said flexible elements having extended free ends at opposite sides of said slits and constituting ties.

14. A disposable sterile shield or cover member for obstetrical or similar purposes comprising a paper sheet to cover the pelvic and abdominal regions of the patient, said paper sheet having spaced openings to receive the patient's thighs, said paper sheet also having a notch between said openings to expose the vaginal region of the patient, said paper sheet also having slits from said openings to opposite edges of the sheet, and flexible reinforcing elements secured to said paper sheet around the edges of said openings, said flexible elements having extended free ends at opposite sides of said slits and constituting ties, said paper sheet having an extensive reinforced area in which said openings, notch, and slits are formed.

15. A disposable sterile shield or cover member for surgical or similar purposes comprising an elongated paper sheet having an extensive reinforced area at one end portion, said paper sheet being adapted to cover at least the pelvic and abdominal regions of the patient and having an operating opening through said reinforced area, said paper sheet having slits through said reinforced areas and spaced from opposite sides of said operating opening, and loose-fitting paper stockings attached to said sheet in communication with said slits.

16. A disposable shield or cover member for surgical or similar purposes, comprising a paper sheet having a reinforced area with an operating opening through said reinforced area, and a folded edge reinforcing means extending around said opening to form a smooth rounded edge therefor while further strengthening same against accidental tearing and wherein the reinforced area has a second sheet cooperating therewith and which is relatively soft, self-reinforced, and substantially waterproof, said second sheet having an operating opening therethrough, said folded edge reinforcing means being in the form of multiple folded edge members laid in overlapping end pattern with their folded edges extending inward of the edges of said opening in said second sheet to form the final operating opening, and wherein there is a main sheet with an operating opening a little larger than the opening between said folded edge members, said main sheet overlying said folded edge members and being relatively soft, self-reinforced, strong when wet, and having water absorbing characteristics, said second sheet, folded edge members, and main sheet being adhesively fastened together into a unit assembly.

17. A disposable sterile craniotomy shield or cover member comprising a sheet of paper having a central reinforced area extending from a point near one end of the sheet to the other end thereof, said paper sheet having an opening through the inner end portion of said reinforced area, and also having a central slit through said reinforced area, said slit being long and narrow and extending from said opening to said other end of said sheet.

18. A disposable sterile craniotomy shield or cover member comprising a sheet of paper having a central reinforced area extending from a point near one end of the sheet to the other end thereof, said paper sheet having an opening through the inner end portion of said reinforced area, and also having a central slit through said reinforced area, said slit extending from said opening to said other end of said sheet, together with a flexible reinforcing element secured to said sheet around the edge of said opening, said flexible element having extended free ends at opposite sides of said slit and constituting ties.

19. A disposable sterile shield for obstetrical or similar purposes comprising a loose-fitting stocking with an open end and formed from a moderately soft non-woven cellulose material which is tear resistant and relatively strong when wet, said stocking having pockets adjacent and opening away from said open end, said pockets being in position to receive the fingers of a nurse's sterile hands to aid in slipping said stocking, open end first, over a conventionally supported and elevated leg of the patient lying, for instance, on an operating or delivery table having a stirrup means for supporting the leg to be covered; wherein said stocking is closed at its end which is opposite said open end, and said pockets are in the form of an outside cuff extending on opposite sides of the open end of said stocking, said stocking being open along one side edge substantially the full depth of said cuff, starting at the open end of said stocking, to facilitate fitting same over said patient's leg.

20. A disposable sterile shield for obstetrical or similar purposes comprising a loose-fitting stocking with an open end and formed from a moderately soft non-woven cellulose material which is tear resistant and relatively strong when wet, said stocking having a pair of front and back panels directly joined to each other at their side edges, said panels each having a pocket with said pockets being adjacent and opening away from said open end in position to receive the fingers of a nurse's sterile hands to aid in slipping said stocking, open end first, over a conventionally supported and elevated leg of the patient lying, for instance, on an operating or delivery table having a stirrup means for supporting the leg to be covered by said stocking.

21. A structure as specified in claim 20; wherein said stocking is closed at its end opposite said open end, and said pockets are in the form of an outside cuff extending on opposite sides of the open end of said stocking, said stocking being open along one side edge substantially the full depth of said cuff starting at the open end of said stocking, to facilitate fitting same over said patient's leg.

References Cited in the file of this patent

UNITED STATES PATENTS

| | | |
|---|---|---|
| 1,724,443 | Wheeler | Aug. 13, 1929 |
| 1,741,837 | Gilbert | Dec. 31, 1929 |
| 2,511,417 | Schindler | June 13, 1950 |
| 2,623,523 | Benson | Dec. 30, 1952 |
| 2,658,512 | Tcheong | Nov. 10, 1953 |
| 2,715,902 | Shaffer et al. | Aug. 23, 1955 |

FOREIGN PATENTS

| | | |
|---|---|---|
| 1,072,905 | France | Mar. 17, 1954 |